United States Patent
Li et al.

(10) Patent No.: US 8,423,905 B2
(45) Date of Patent: Apr. 16, 2013

(54) AUTOMATICALLY POPULATING RECIPIENTS IN AN INSTANT MESSAGING OR OTHER COMPUTER COMMUNICATION SYSTEM

(75) Inventors: FuYi Li, Sudbury, MA (US); Anita Devadason, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1024 days.

(21) Appl. No.: 12/175,086

(22) Filed: Jul. 17, 2008

(65) Prior Publication Data

US 2010/0017753 A1      Jan. 21, 2010

(51) Int. Cl.
G06F 3/048 (2006.01)
G06F 3/00 (2006.01)
G06F 7/00 (2006.01)
G06Q 10/00 (2012.01)

(52) U.S. Cl.
USPC ........... 715/810; 715/739; 715/751; 707/705; 707/706; 705/7.13

(58) Field of Classification Search .................. 715/810, 715/968, 751, 739; 707/705, 706; 705/7.13
See application file for complete search history.

(56) References Cited

U.S. PATENT DOCUMENTS

| | | | | |
|---|---|---|---|---|
| 6,075,851 | A * | 6/2000 | Pinard et al. ................. | 379/199 |
| 6,990,495 | B1 * | 1/2006 | Grason et al. ................ | 1/1 |
| 7,752,167 | B1 * | 7/2010 | Osborn ........................ | 707/621 |
| 7,761,439 | B1 * | 7/2010 | Auerbach ..................... | 707/706 |
| 2003/0014477 | A1 * | 1/2003 | Oppenheimer et al. ...... | 709/203 |
| 2003/0126137 | A1 * | 7/2003 | McFadden ................... | 707/100 |
| 2003/0191806 | A1 * | 10/2003 | Osterberg et al. ............ | 709/206 |
| 2004/0010554 | A1 * | 1/2004 | Hall et al. .................... | 709/206 |
| 2004/0161080 | A1 * | 8/2004 | Digate et al. ................ | 379/88.17 |
| 2004/0167866 | A1 * | 8/2004 | Kaw et al. .................... | 707/1 |
| 2004/0199581 | A1 * | 10/2004 | Kucharewski et al. ....... | 709/204 |
| 2004/0267670 | A1 * | 12/2004 | Minyailov .................... | 705/51 |
| 2005/0102368 | A1 * | 5/2005 | Forman et al. ............... | 709/207 |
| 2005/0216444 | A1 * | 9/2005 | Ritter et al. .................. | 707/3 |
| 2006/0288298 | A1 * | 12/2006 | Haitani et al. ............... | 715/739 |
| 2007/0198643 | A1 * | 8/2007 | Cope ........................... | 709/206 |

(Continued)

OTHER PUBLICATIONS

Jane Kirkland; Dorothy Burke Sams Teach Yourself Lotus Notes 7 in 10 Minutes Oct. 27, 2005 pp. 4, 5, 20-23, 186-189, 194, and 195.*

(Continued)

*Primary Examiner* — Adam M Queler
*Assistant Examiner* — Andrea Long
(74) *Attorney, Agent, or Firm* — David A. Dagg

(57) ABSTRACT

A system and a method for automatically populating chat recipients in an instant messaging system in which chat recipients are automatically populated from external data sources, e.g. clipboard, spreadsheet, document, database, directory, etc., and a chat session started with the click of a single user interface button or the like. A pop-up window is generated that allows the user to select a data source from which the chat recipients are to be obtained. The data source may be scanned to identify candidate names matching a predetermined name format, or the user is prompted to provide at least a portion of a search string. The user can then select which of the returned names are to be used in initiating the chat session. The disclosed system then generates a user interface object allowing the initiating user to perform an action with the selected recipients, including initiating a chat session.

18 Claims, 4 Drawing Sheets

U.S. PATENT DOCUMENTS

2007/0226632 A1* 9/2007 Erola et al. .............. 715/739
2007/0255789 A1* 11/2007 Buchheit .................. 709/206
2007/0294428 A1* 12/2007 Guy et al. ................ 709/245
2009/0031232 A1* 1/2009 Brezina et al. .......... 715/764

OTHER PUBLICATIONS

Jim Boyce Microsoft Office Outlook 2007 Plain & Simple Jan. 15, 2007 p. 59 and 60.*

Kate Shoup Teach Yourself Visually Outlook 2007 Jul. 30, 2007 p. 213 and 214.*

Computer Performance LTD LDAP Properties for CSVDE and VBScript copyright 1999-2007 4 pages.*

ContactCopy 1.0.0.17 Publisher's Description, Jan. 25, 2007, p. 1.

* cited by examiner

NAME SELECTION CRITERIA

Enter Text To Be Matched:

carl
→ 74 cara@company.com
carl@company.com
chipcarter@company.com
cleocarson@company.com
jcarol@company.com
} 78

AUTOMATICALLY POPULATING RECIPIENTS IN AN INSTANT MESSAGING OR OTHER COMPUTER COMMUNICATION SYSTEM

FIELD OF THE INVENTION

The invention relates generally to computer communications systems, such as instant messaging systems, and more specifically to a system and method for automatically populating chat recipients in an instant messaging or other computer communication system.

BACKGROUND OF THE INVENTION

Most existing instant messaging systems, such as Yahoo!® Messenger, AOL Instant Messenger (AIM®), IBM® Lotus Sametime, etc., allow users to start a chat session by clicking on a person's screen name (also called a handle, nickname, or nick), as displayed within a buddy list user interface object, and/or located within a directory. In addition, some existing instant messaging systems are embedded in other systems (e.g. IBM® Lotus Notes), such that a user can click on a person's name within an e-mail message entry to start a chat session with that person. A problem with existing systems instant messaging systems is the requirement that a person initiating a chat session must either be able to locate the other person's name in the buddy list, directory, or the like, or the chat initiator must know how to spell the other person's name. This is a problem in the many cases where a user wants to start a chat session quickly, but may not know how to spell the other person's screen name, and the other person's name is not stored in a buddy list, directory, etc., that is conveniently available to the initiating user. The chat initiator must accordingly manually look up the other person's name in an external resource, such as a meeting invitation, document, spreadsheet, Web application, etc. To do so, the initiating user has to first launch an external application first, and then manually copy and paste the other user's screen name or the like into the instant messaging system application before starting the chat session. Moreover, when a user wants to start a group chat session involving multiple other people, the specific set of people desired may not already be organized into an existing group known by the instant messaging system, and may not even be known individually to the instant messaging system. In such a case, the initiating user maybe required to individually enter each desired person in the group into their buddy list. This process requires many steps, and can make starting a group chat session difficult.

In some existing systems (e.g. IBM® Lotus Notes) the user can highlight or select a command (e.g. "Chat with All") that causes a group session to be initiated with all other users that are recipients of an e-mail message. However, such solutions fail to address the problem of working within a stand-alone instant messaging application in the situation where the other user's screen name is not in the instant messaging system directory.

In other existing systems (e.g. ContactCopy of LoquiSoft), manually highlighted identifiers can be copied into an address book with the click of a button. However, the system still requires that the user add the contacts into an address book before performing useful actions, e.g. before initiating a group chat session.

For the above reasons and others it would be desirable to have a new system that allows a user to conveniently initiate a "transient" instant messaging session without having to add the other participants' names into an address book or the like prior to initiating the session. The new system should advantageously address situations such as when a user is in a group meeting or the like, and needs to send information (e.g. conference meeting information, etc.) quickly to all meeting invitees without having to go into another application that stores the screen names, e-mail addresses, etc. of the desired chat participants.

SUMMARY OF THE INVENTION

To address the above described and other shortcomings of existing systems, a system and a method for automatically populating chat recipients in an instant messaging system are disclosed. In the disclosed system, chat recipients are automatically populated from external data sources, e.g. clipboard, spreadsheet, document, database, directory, etc., and a chat session started with the click of a single user interface button or the like.

A button, menu action, or the like, is generated that allows a user to start a chat session. After the user clicks on the button, a pop-up window is generated that allows the user to select the specific data source from which the chat recipients are to be obtained. Examples of data sources from which chat recipients may be obtained include a clipboard, file (e.g. word processing document, spreadsheet, text file, etc.), directory (e.g. LDAP directory, etc.), database, buddy list, address book, etc. If the user selects the clipboard or file as the data source, the data source is scanned to identify all candidate names that match a predetermined name format (e.g. valid screen names, e-mail addresses, RFC-821/SMTP e-mail addresses, proprietary formats, etc.). If the user selects a searchable database, buddy list, address book, etc., the user is prompted to provide at least a portion of a search string. The disclosed system then finds entries in the data source matching the search string provided by the user, and may further provide "type-ahead" functionality that fills in characters matching existing entries when the user starts to type in the portion of the search string. The user can then select which of the names returned as a result of searching the data source are to be used in initiating the chat session. In addition, if the selected data source supports hierarchical information organization (e.g. as within an LDAP or the like), the disclosed system then generates user interface options allowing the user to initiate a chat session with recipients within a specified portion of the organization (e.g. all persons reporting to the initiating user or some other specified user, all peers of the initiating user or some other specified user, the initiating user's manager, etc.).

The disclosed system then displays the resulting set of names or the like from which the initiating user can select one or more recipients for the chat session. The disclosed system then generates a user interface object allowing the initiating user to perform an action with the selected recipients, including initiating a chat session with all the selected recipients. Other options may further be provided in the user interface to the initiating user, including the option of sending a broadcast e-mail message to all of the selected users, adding all of the selected users to the initiating user's buddy list, etc.

While embodiments of the disclosed system are described herein with reference to accessing and selecting screen names used in an instant messaging sessions, the disclosed system is not so limited. Accordingly, In an alternative embodiment, e-mail addresses of other users are selected by the initiating user for the purpose of initiating chat sessions with the corresponding users, automatically filling in recipients for a broadcast e-mail message, etc.

The advantages of the disclosed system include the fact that chat recipient names do not have to be saved into a buddy list, address book, etc., and transient chat sessions can be provided conveniently. Thus, situations where the chat initiator does not chat with the same group of participants often are supported without requiring the chat initiator to import and/or store the participant screen names into the buddy list, address book, etc.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 3 is a first simplified screen shot showing user interface display objects generated in an illustrative embodiment.

DETAILED DESCRIPTION OF EXEMPLARY EMBODIMENTS

Figure 1:
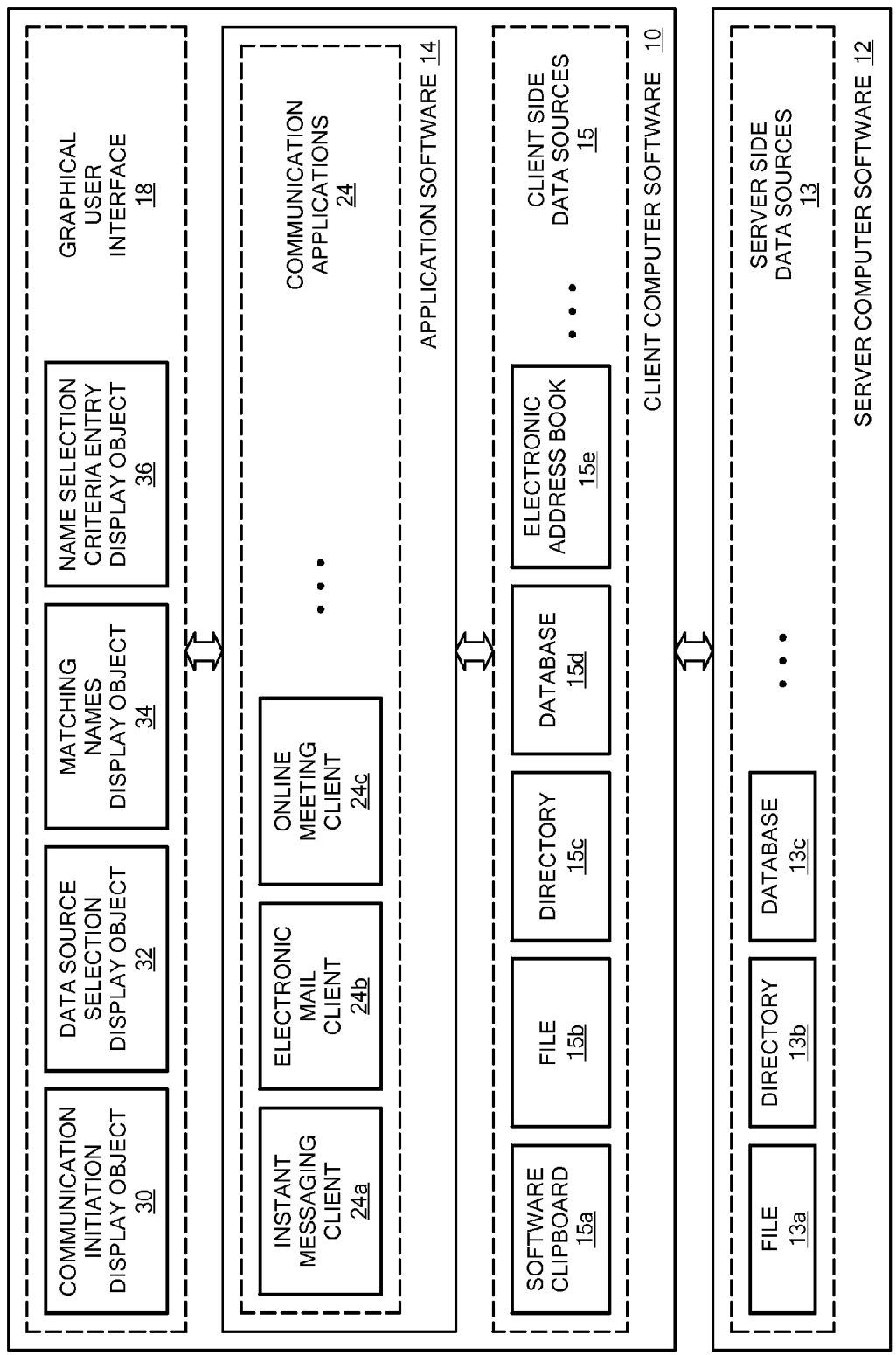
FIG. 1 is a block diagram showing hardware and/or software components in an illustrative embodiment.

FIG. 1 is a block diagram showing hardware and/or software components in an illustrative embodiment. As shown in FIG. 1, a Client Computer System 10 includes Application Software 14, Client Side Data Sources 15, and Graphical User Interface 18 generated by the Application Software 14. The Application Software 14 includes a number of Communication Applications 24, shown in the illustrative embodiment of FIG. 1 as including an Instant Messaging Client 24a, Electronic Mail Client 24b, Online Meeting Client 24c, etc. The Graphical User Interface 18 generated at least in part by the Application Software 14 includes a Communication Initiation Display Object 30, a Data Source Selection Display Object 32, a Matching Names Display Object 34, and a Name Selection Criteria Entry Display Object 36.

The Communication Initiation Display Object 30 may, for example, be embodied using a graphical button, menu item, or any other specific type of graphical user interface display object, that allows the user to initially trigger operation of the disclosed system using a single selection operation, such as a mouse click or the like performed on the Communication Initiation Display Object 30 by a user of the Client Computer System 10. The Data Source Selection Display Object 32 may be embodied as a list of user selectable data source names or any other specific type of graphical user interface display object that allows a user to select one or more of a set of displayed data source names. The Matching Names Display Object 34 may be embodied as a list of names, such as instant messaging screen names, electronic mail addresses, user names, etc., where the names contained in the list are names found in one or more currently selected user selected data sources that match the current name selection criteria. The Name Selection Criteria Entry Display Object 36 may be embodied using any type of user interface display object that allows a user of the Client Computer System 10 to enter at least a portion of the name selection criteria to be applied.

The Software Clipboard 15a may be embodied as any specific type of software program that is used for short-term storage of data as it is transferred by the user of the Client Computer System 10 between documents or applications, via copy and paste operations. The File 15b and/or 13a may be embodied as any specific type of file that contains one or more names (e.g. screen names, electronic mail addresses, user names, etc.), such as a text file, word processing application file, spreadsheet program file, etc. The Directory 15c and/or 13b may be embodied as any specific type of hierarchical directory, such as a directory of folders containing files or other folders in a file system provided in the client computer system 10. The Database 15d and/or 13c may be embodied as any specific type of database. The Directory 15c and/or Database 15d may be embodied as compatible with the Lightweight Directory Access Protocol (LDAP) application protocol for querying directory services running over TCP/IP. For example, the Directory 15c and/or Database 15d may be embodied as a hierarchical representation of members, e.g. employees, within a business organization, e.g. a company. In such an embodiment, the hierarchical representation of the business organization would reflect the reporting structure of the organization, with people that report to a given manager ("reports" of the manager) being located directly below that manager. Similarly, in such an embodiment, employees at the same level of the business organization ("peers") would be located at the same level within the hierarchical structure. Alternatively, any other specific hierarchical representation of persons may be used.

The Electronic Address Book 15e may be embodied using any specific software for storing entries containing contact and other information associated with corresponding contacts. For example, each contact entry in the Electronic Address Book 15e may consist fields for first name, last name, company name, address, telephone number, e-mail address, fax number, mobile phone number, and/or other information for the corresponding contact.

The Client Computer System 10 of FIG. 1 may be any specific type of computer system and/or intelligent electronic device, such as a desktop, laptop, or palmtop computer system, and/or personal digital assistant, cell phone, or other electronic device. The Client Computer System 10 includes or controls a display device capable of displaying a graphical user interface (e.g. including Graphical User Interface 18) to a respective local user, such as a liquid crystal display (LCD), cathode ray tube (CRT), interferometric modulator display (IMOD), light emitting diode (LED), or the like.

Those skilled in the art will further recognize that the Application Software 14, Client Side Data Sources 15 and Server Side Data Sources 15 of FIG. 1 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware.

Those skilled in the art will further recognize that the Client Computer System 10 and Server Computer System 12 of FIG. 1 may include one or more processors, and program storage, such as memory, for storing program code executable on such processors, as well as input/output devices and/or interfaces. In the example of FIG. 1, the Client Computer System 10 and Server Computer System 12 are connected to a data communication network (e.g. the Internet, a Local Area Network, etc.) through one or more of such input/output devices or interfaces, and through which may further be provided communication to a number of other client systems and/or server systems.

While for purposes of concise illustration only one client computer system and one server computer are shown in FIG. 1, the disclosed system is not limited to any specific number of computer systems. Moreover, while certain functions are described as being performed in the Client Computer System 10, the disclosed system is not limited to any specific configuration or implementation in that regard. Accordingly, operations described as occurring in the Client Computer System 10 may alternatively be performed in one or more interconnected server systems (e.g. Server Computer System 12). In addition, while the illustrative embodiment of FIG. 1 is described using a client-server architecture, the disclosed system is not limited to such an embodiment, and may alternatively be embodied using any other specific type of system architecture that may be appropriate and/or advantageous for a given implementation.

Figure 2:
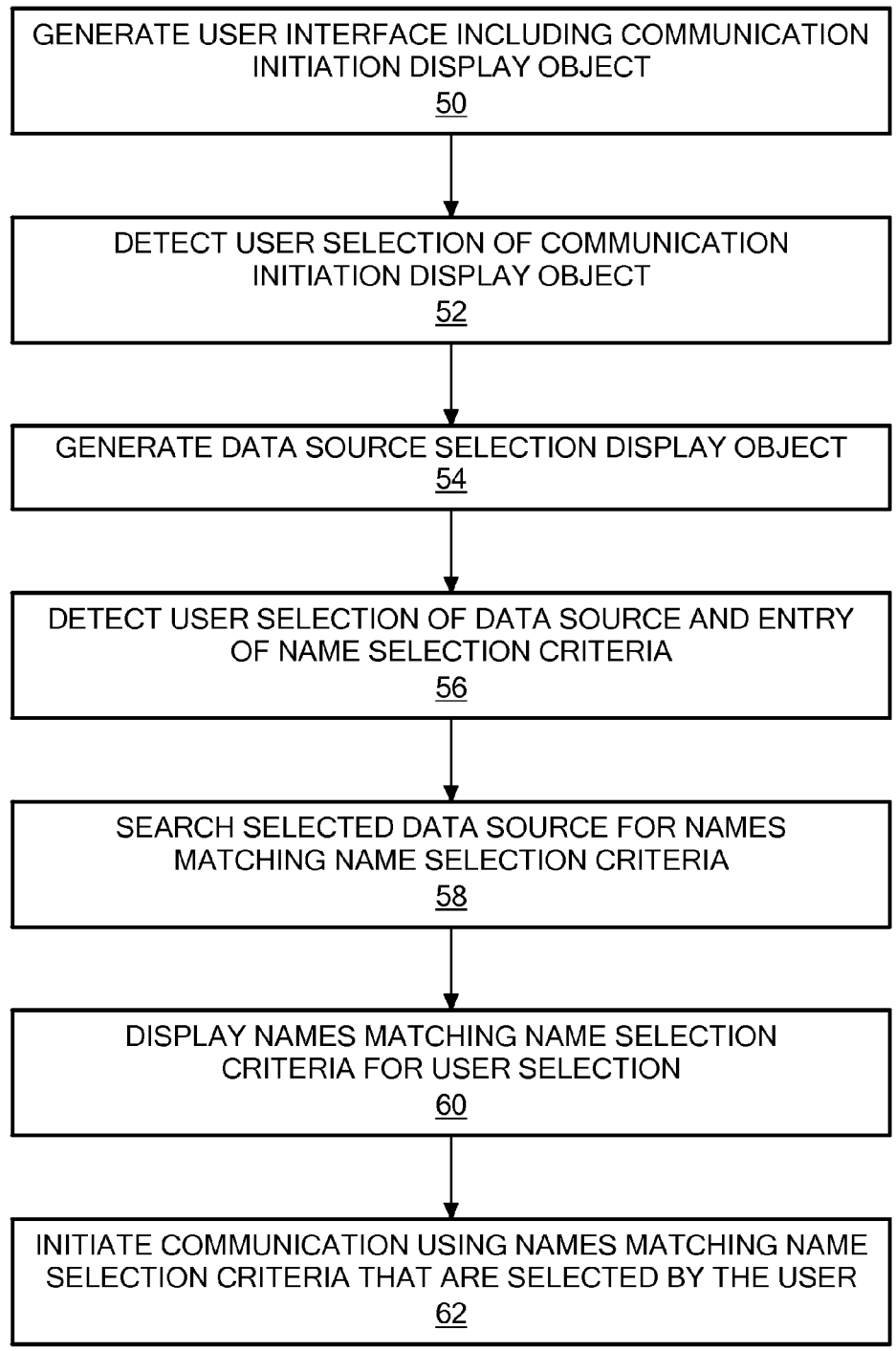
FIG. 2 is a flow chart showing steps performed during operation of an illustrative embodiment.

FIG. 2 is a flow chart showing steps performed during operation of an illustrative embodiment. The steps of FIG. 2 may, for example, be performed wholly or in part by the Application Software 14, Client Side Data Sources 15, and/or Server Side Data Sources 13 of FIG. 1.

At step 50, the disclosed system generates a user interface including a communication initiation display object (e.g. Communication Initiation Display Object 30). At step 52, the disclosed system detects a local user selecting the communication initiation display object generated at step 50, e.g. by clicking on the communication initiation display object. At step 54, in response to detecting the user selecting the communication initiation display object at step 52, the disclosed system generates a data source selection display object (e.g. Data Source Selection Display Object 32). The data source selection display object includes a list of user selectable data sources from which names can be obtained using the disclosed system (e.g. names of data sources shown in Client Side Data Sources 15 and Server Side Data Sources 13).

At step 56, the disclosed system detects user selection of one or more of the data sources displayed in the data source selection display object generated in step 54. In one embodiment, at step 56 the disclosed system also inputs name selection criteria to be applied when searching and/or scanning the selected data sources (e.g. through the Name Selection Criteria Input Display Object 36). The name selection criteria input from the local user at step 56 may, for example, include text that is to be matched within any names that are determined to match the name selection criteria. Accordingly, in such an embodiment, if the local user enters the string "Thomas" as name selection criteria, then only names including the character string "Thomas" will be considered to match the name selection criteria.

At step 58, the disclosed system searches and/or scans the data sources selected by the user at step 56 for names matching the name selection criteria. For example, for any selected data sources that include text that can be searched, e.g. a software clipboard, text file, spreadsheet file, etc., the disclosed system may be embodied such that those data sources are scanned for text strings that match a pre-determined format. In this way, the disclosed system may be embodied to scan such data sources for valid screen names, electronic mail addresses, user names, etc. In one embodiment, the disclosed system scans one or more selected data sources at step 58 to find electronic mail addresses contained in the data sources that are conformant with the Simple Mail Transfer Protocol (SMTP) as set forth in RFC-821. Alternatively, or in addition, the disclosed system may scan one or more selected data sources at step 58 to find all screen names and/or electronic mail addresses that are conformant with a predetermined proprietary format.

In addition, or alternatively, if the user selects one or more data sources at step 56 that include a hierarchical organization of information, e.g. a database and/or LDAP directory that represents employees in a business organization in terms of reporting hierarchy, the disclosed system may be embodied such that at step 58 that selected data source is searched for names based on the represented hierarchy. For example, in such an embodiment, the user may be prompted to enter name selection criteria at step 56 indicating some portion of the hierarchically organized data source. Such name selection criteria may, for example, include indication that names are to be returned for all employees of the business organization that report to a given manager, a managers that a given employee reports to, all employees that are at the same level of the hierarchy as a given employee ("peers" of the given employee), etc.

At step 60, the disclosed system displays all names determined to match the name selection criteria in step 58 to the local user (e.g. in Matching Names Display Object 34). At step 62 the disclosed system detects which of the names displayed at step 60 have been selected by the user (e.g. by the user clicking on them). Thus the user can select a subset or all of the names displayed at step 60 to use for initiating a communication. Further at step 62, the disclosed system initiates a user selected communication using the names selected by the user. For example, the disclosed system may initiate a group chat session by sending an instant message to all the names selected by the local user, send an electronic mail message to all the names selected by the local user, or start an online meeting with all the names selected by the local user. Alternatively, the disclosed system may add all the names selected by the local user to a buddy list of the local user maintained by the instant messaging application.

The specific type of communication initiated with the user selected names at step 62 may be pre-configured or user selectable. For example, a user interface object may be generated at step 62 (e.g. a menu, drop down list, etc.) that enables the local user to select from any of the above described communication operations to be performed.

FIG. 3 is a first simplified screen shot showing user interface display objects generated in an illustrative embodiment. The display object 72 is an example of at least a portion of the Name Selection Criteria Entry Display Object 36 in FIG. 1. In the embodiment of FIG. 3, the user is allowed to enter name selection criteria consisting of text that must be matched in the names returned from the selected data sources. Moreover, in the embodiment of FIG. 3, the disclosed system operates to provide type-ahead functionality such that as the user enter each character, those names in the selected data sources that match the characters entered by the user are displayed in the list 78. Accordingly, as shown for purposes of illustration in FIG. 3, the user has typed in the letters "car", and the disclosed system has generated a list 78 of names in the previously selected data sources that each include the string "car" within them. The list 78 is an example of the Matching Names Display Object 34 of FIG. 1.

Figure 4:
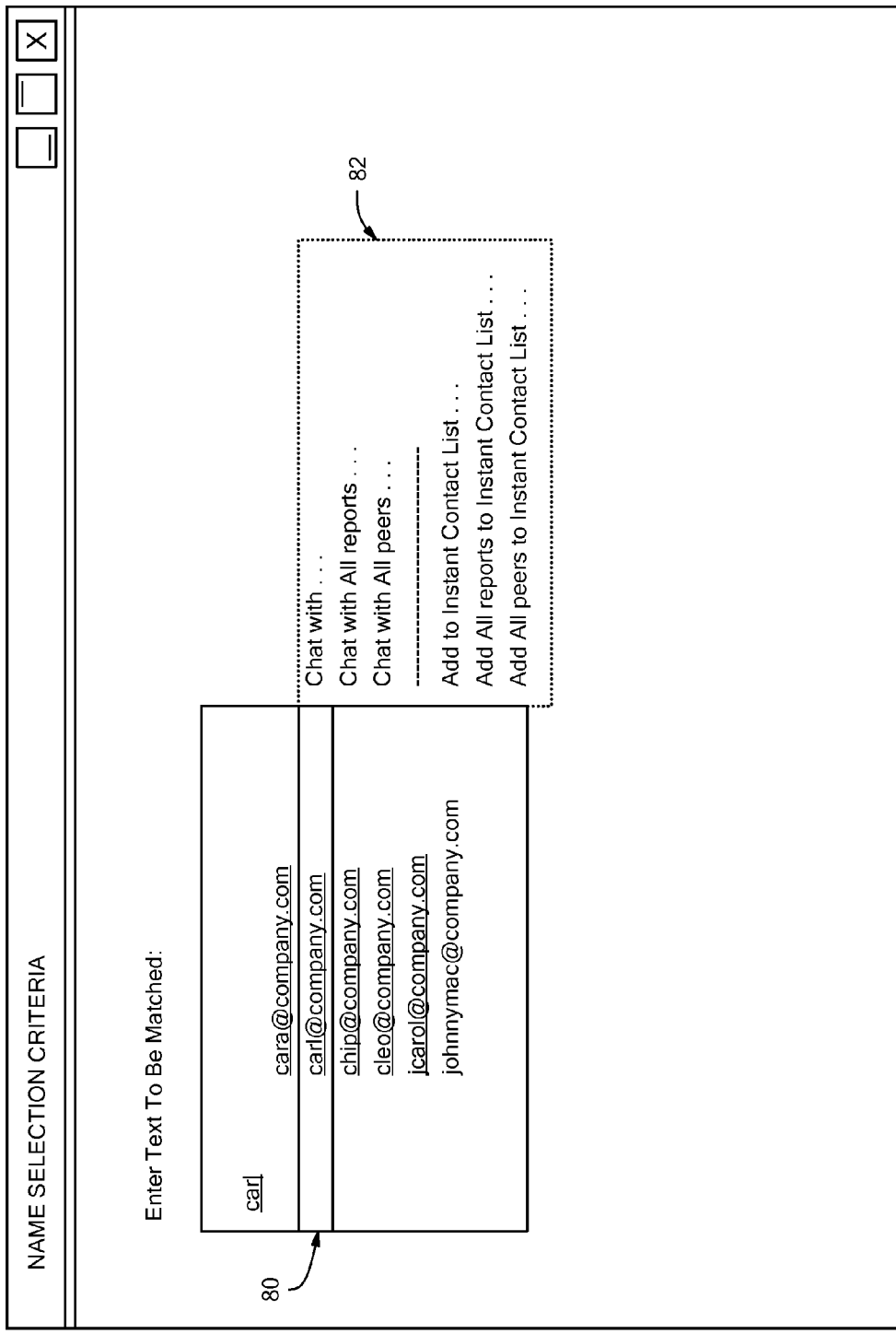
FIG. 4 is a second simplified screen shot showing user interface display objects generated in an illustrative embodiment.

FIG. 4 is a second simplified screen shot showing user interface display objects generated in an illustrative embodiment. The disclosed system has now detected that the local user has now clicked on the name 80 in the list 78, and as a result has generated the display object 82, which includes a list of clickable commands that the user can perform. The display object 82 is a further example of how the user can input name selection criteria into the disclosed system, since it allows the user to further refine how names in the previously selected data source(s) are selected. As shown in FIG. 4, the selectable options provided to the user in list 82 include initiating a chat session with the selected name 80 as the chat recipient ("Chat with . . . "), initiating a chat session with all persons that report to the user with the selected name ("Chat with All reports . . . "), initiating a chat session with all persons that are peers of the user with the selected name ("Chat with All peers . . . "), adding the selected name to the user's instant messaging contact list or buddy list ("Add to Instant Contact List . . . "), adding all persons reporting to the person with the selected name to the user's instant messaging contact list or buddy list ("Add All reports to Instant Contact List . . . "), and adding all peers of the person with the selected name to the user's contact list or buddy list ("Add All peers to Instant Contact List . . . "). It will be recognized that the options shown in the list 82 are given only for purposes of illustration, and other options may alternatively or additionally be provided. Similarly, while only one user 80 is selected in the example of FIG. 4, the user may alternatively select (e.g. click on, etc.) multiple users from the list 78. In addition, while the above description and accompanying figures makes reference to and/or shows certain examples that include names consisting of electronic mail addresses and/or instant messaging screen names, the embodiments of the disclosed system are not limited in application or design to use of only electronic mail addresses and/or screen names, and may accordingly use either electronic mail addresses and/or screen names, as may be appropriate or advantageous.

While the above description regarding illustrative embodiments of the disclosed system includes examples of specific user interface operations and/or display objects, the disclosed system is not limited to these specific embodiments. Accordingly, the user interface objects provided herein may be modified as appropriate for various alternative embodiments, using various specific configurations of graphical buttons, menus, dialog boxes, and the like. Those skilled in the art will accordingly recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and/or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

We claim:

1. A method comprising:

generating, by a communication application, a user interface including a communication initiation display object;

in response to selection of said communication initiation display object by a local user, generating, by said communication application, a data source selection display object, said data source selection display object displaying a plurality of data sources, wherein said plurality of data sources includes a hierarchical organization of names external to said communication application;

in response to selection of said hierarchical organization of names by said local user, searching said hierarchical organization of names for names matching a name selection criteria;

displaying, by said communication application, names from said hierarchical organization of names that match said name selection criteria to said local user;

in response to selection of a selected one of said names that match said name selection criteria by said local user, displaying a commands display object including a plurality of user selectable commands, said commands including a command to initiate a chat communication with all persons reporting to a user corresponding to said selected one of said names that match said name selection criteria; and in response to selection of said command to initiate a chat communication with all persons reporting to said user corresponding to said selected one of said names that match said name selection criteria, automatically initiating a chat communication through said communication application with said persons reporting to said user corresponding to said selected one of said names.

2. The method of claim 1, further comprising:

wherein said name selection criteria includes a name format compatible with said communication application; and wherein said names matching said name selection format comprise names conforming to said name format.

3. The method of claim 1, wherein said communication application comprises an instant messaging application and wherein said name format comprises an instant messaging screen name format.

4. The method of claim 1, wherein said searching said selected one of said plurality of data sources for names matching a name selection criteria further comprises:

generating a name selection criteria user interface object; and inputting at least a portion of said name selection criteria from said local user through said name selection criteria user interface object.

5. The method of claim 4, wherein said portion of said name selection criteria input from said local user comprises a search string, and wherein said names matching said name selection format comprise names matching said search string.

6. The method of claim 5, further comprising:
providing type-ahead in said name selection criteria user interface object as characters are entered by said local user into said name selection criteria user interface object, wherein said type-ahead displays names in said selected data source matching said characters entered by said local user into said name selection criteria user interface object.

7. The method of claim 4, further comprising:
wherein said portion of said name selection criteria input from said local user comprises an indication of a subset of said hierarchical organization of names.

8. The method of claim 1, wherein said commands further include a command to initiate a chat communication with all persons that are peers of said user corresponding to said selected one of said names that match said name selection criteria.

9. The method of claim 1, wherein said commands further include a command to initiate a chat communication with a manager of said user corresponding to said selected one of said names that match said name selection criteria.

10. The method of claim 1, wherein each of said plurality of user selectable commands comprises a portion of a graphical command list.

11. The method of claim 1, wherein said plurality of data sources comprises:
a software clipboard,
a file, and
a Lightweight Directory Access Protocol (LDAP) directory; and
wherein said hierarchical organization of names comprises said Lightweight Directory Access Protocol (LDAP) directory.

12. The method of claim 11, wherein said file comprises a text file.

13. The method of claim 11, wherein said file comprises a word processing file.

14. The method of claim 11, wherein said file comprises a spreadsheet file.

15. The method of claim 11, wherein said plurality of data sources further comprises an instant messaging application buddy list.

16. The method of claim 1, wherein said names comprise instant messaging screen names.

17. A system comprising:
at least one processor;
program storage having communication application program code stored thereon, said communication application program code for execution on said at least one processor to
generate a user interface including a communication initiation display object,
in response to selection of said communication initiation display object by a local user, generate a data source selection display object, said data source selection display object displaying a plurality of data sources, wherein said plurality of data sources includes a hierarchical organization of names external to said communication application,
in response to selection of said hierarchical organization of name by said local user, search said hierarchical organization of names for names matching a name selection criteria,
display names from said hierarchical organization of names that match said name selection criteria to said local user,
in response to selection of a selected one of said names that match said name selection criteria by said local user, display a commands display object including a plurality of user selectable commands, said commands including a command to initiate a chat communication with all persons reporting to a user corresponding to said selected one of said names that match said name selection criteria; and
in response to selection of said command to initiate a chat communication with all persons reporting to said user corresponding to said selected one of said names that match said name selection criteria, automatically initiate a chat communication through said communication application with said persons reporting to said user corresponding to said selected one of said names.

18. A computer program product comprising:
non-transitory storage media having communication application program code stored thereon, said communication application program code including
program code for generating a user interface including a communication initiation display object,
program code for, in response to selection of said communication initiation display object by a local user, generating a data source selection display object, said data source selection display object displaying a plurality of data sources, wherein at least one of said plurality of data sources includes a hierarchical organization of names external to said communication application,
program code for, in response to selection of said hierarchical organization of names by said local user, searching said hierarchical organization of names for names matching a name selection criteria,
program code for displaying names from said hierarchical organization of names that match said name selection criteria to said local user,
program code for, in response to selection of a selected one of said names that match said name selection criteria by said local user, displaying a commands display object including a plurality of user selectable commands, said commands including a command to initiate a chat communication with all persons reporting to a user corresponding to said selected one of said names that match said name selection criteria; and
program code for, in response to selection of said command to initiate a chat communication with all persons reporting to said user corresponding to said selected on of said names that match said name selection criteria, initiating a chat communication through said communication application with said persons reporting to said user corresponding to said selected one of said names.

* * * * *